United States Patent [19]

Moczygemba

[11] 4,113,930

[45] Sep. 12, 1978

[54] HYDROGENATED 1,3-CYCLOHEXADIENE/1,3-BUTADIENE COPOLYMERS

[75] Inventor: George A. Moczygemba, Bartlesville, Okla.

[73] Assignee: Phillips Petroleum Company, Bartlesville, Okla.

[21] Appl. No.: 711,029

[22] Filed: Aug. 2, 1976

[51] Int. Cl.$^2$ ................................................ C08F 8/04
[52] U.S. Cl. ........................................ 526/25; 526/20; 526/118
[58] Field of Search ............................ 526/25, 118, 20

[56] References Cited

U.S. PATENT DOCUMENTS

| | | | |
|---|---|---|---|
| 3,400,115 | 9/1968 | Dawans et al. | 526/118 |
| 3,497,488 | 2/1970 | Dawans et al. | 526/135 |
| 3,696,088 | 10/1972 | De Vault | 526/25 |
| 3,723,400 | 3/1973 | Dolgoplosk et al. | 526/130 |
| 3,740,382 | 6/1973 | Dolgoplosk et al. | 260/82.1 |
| 3,756,977 | 9/1973 | Yoshimoto et al. | 526/25 |
| 4,020,251 | 4/1977 | Hsieh | 526/25 |

Primary Examiner—William F. Hamrock

[57] ABSTRACT

Hydrogenated 1,3-cyclohexadiene/1,3-butadiene copolymers having unexpectedly high green tensile strength are disclosed. The method for producing such hydrogenated copolymers is also disclosed.

13 Claims, No Drawings

HYDROGENATED 1,3-CYCLOHEXADIENE/1,3-BUTADIENE COPOLYMERS

BACKGROUND OF THE INVENTION

This invention relates to hydrogenated copolymers. In another aspect this invention relates to hydrogenated 1,3-cyclohexadiene/1,3-butadiene copolymers.

Essentially random copolymers of 1,3-cyclohexadiene and 1,3-butadiene at a weight ratio in the range of about 40/60 to about 60/40 have been prepared which have relatively low green tensile strength. A low green tensile strength is a general characteristic of random copolymers, e.g. butadiene/styrene random copolymers. Likewise, hydrogenated counterparts of random copolymers, e.g. butadiene/styrene random copolymers, also have relatively low green tensile strength. Surprisingly, it has been discovered that when copolymers of 1,3-cyclohexadiene/1,3-butadiene, prepared as indicated below, are hydrogenated, the green tensile strength is unexpectedly higher than that of the parent (unhydrogenated) copolymer.

Accordingly, it is an object of this invention to provide hydrogenated 1,3-cyclohexadiene/1,3-butadiene copolymers having unusual green tensile strength.

Further it is an object of this invention to provide a method for increasing the green tensile strength of essentially random copolymers of 1,3-cyclohexadiene and 1,3-butadiene.

Further aspects, objects and advantages of the invention will become apparent to one skilled in the art upon studying the specification and appended claims.

SUMMARY OF THE INVENTION

According to this invention, copolymers having unexpectedly high green tensile strength can be prepared by hydrogenating the copolymers which result from copolymerizing 1,3-cyclohexadiene and 1,3-butadiene at a weight ratio in the range of about 40/60 to about 60/40 employing titanium tetrachloride in conjunction with a nickel complex cocatalyst having the general formula $$Ni(L)_n$$ 

wherein $n$ is an integer from 1 to 4 and each ligand L is individually selected from the group consisting of cyclopolyolefins having a cyclic ring consisting of 5 to 14 carbon atoms, a total of 5 to 18 carbon atoms per molecule, and at least two ethylenic bonds within the cyclic ring. Typical cyclopolyolefin nickel complexes include bis(1,5-cyclooctadiene)nickel (0)
bis(cyclopentadiene)nickel (0)
cyclooctatetraene nickel (0)
bis(duroquinone)nickel (0)
1,5,9-centro(all trans cyclododecatriene)nickel (0)
cyclohexadiene nickel (0)
bis(3,7-dimethyl-1,5-cyclooctadiene)nickel (0)
bis(3-phenyl-1,5-cyclooctadiene)nickel (0)
1,5-cyclooctadiene-duroquinone nickel (0)

and mixtures of any two or more thereof.

The preferred cyclopolyolefin nickel complexes are zero-valent nickel complexes. Especially preferred zero-valent nickel complexes are those in which every ligand is a nonconjugated cyclopolyolefin ligand having 8 to 12 carbon atoms in the cyclic ring. Nonconjugated cyclopolyolefin denotes a carbocyclic ring containing at least two ethylenic groups wherein no ethylenic groups in the ring are conjugated. Examples of typical zero-valent nonconjugated cyclopolyolefin nickel complexes include bis(1,5-cyclooctadiene)nickel (0); 1,5,9-centro(all trans cyclododecatriene)nickel (0); bis(duroquinone)nickel (0), and mixtures of any two or more thereof.

The mole ratio of the catalyst components can vary widely. Any mixture of the catalyst components having catalytic activity can be employed. Generally the mole ratio of the above-described cyclopolyolefin nickel complex to the Lewis acid will be in the range of about 30:1 to about 1:30 or more preferably in the range of about 5:1 to about 1:20.

While it is to be understood that the catalyst composition can be employed in any amount that provides a catalyzing effect on the polymerization, generally the quantity of the above-described cyclopolyolefin nickel complex, expressed as gram millimoles per hundred grams of polymerizable conjugated diene, i.e. total monomer, will be in the range of about 0.05 to about 50, and more preferably will be in the range of about 0.5 to about 10.

The polymerization is preferably carried out in the presence of a diluent. Diluents suitable for use in the process include hydrocarbons which are not detrimental to the copolymerization process. Suitable diluents include paraffins, cycloparaffins, and aromatic hydrocarbons and mixtures thereof. Typical diluents are n-hexane; n-heptane; 2,2,4-trimethylpentane; cyclohexane; benzene; toluene; xylenes, and the like, and mixtures of any two or more thereof. In order to promote conversion it has been noted that it is preferable to employ aromatic hydrocarbon diluents. Generally the amount of diluent employed is such that the volume of the 1,3-butadiene comonomer is about 5 to about 50 percent of the combined volumes of said 1,3-butadiene and said diluent.

The pressure in the reaction vessel in which the polymerization is carried out is not critical and may be varied as desired. It is convenient to employ a pressure which is sufficient to maintain the reaction mixture substantially in the liquid phase. Depending, therefore, upon the materials and temperature employed, an autogenous or an elevated pressure can be employed. When elevated pressures are desired they can be provided by a method such as the pressurization of the reactor with a gas which is inert with respect to the polymerization reaction. The polymerization temperature can vary broadly, but generally it is in the range of from about 0° C to about 100° C, preferably from about 20° C to about 70° C.

The time required for the polymerization, exclusive of the time required in catalyst formation and reactor charging, will be dependent upon such factors as the molecular weight desired, quantity of catalyst employed, temperature, and the like, but generally will range from a few minutes to such as 100 hours although, normally, polymerization times will fall within the range of 30 minutes to 24 hours.

The process can be carried out batchwise or as a continuous process.

The copolymers produced by the method set forth above can, in accordance with this invention, have higher green tensile strength imparted thereto by hydrogenating the copolymers. In general, the copolymers can be hydrogenated using any process known by those skilled in the art as being suitable for the hydrogenation of butadiene copolymers or homopolymers. Thus the hydrogenation can be effected by employing either heterogeneous or homogeneous catalysts. Examples of suitable heterogeneous catalysts include those such as nickel on kieselguhr, Raney nickel, copper chromite, molybdenum sulfite, and finely divided platinum or other noble metals deposited on a high surface area carrier.

Preferably homogeneous hydrogenation catalysts are employed. The term "homogeneous" catalyst is meant to include those catalyst systems which are truly soluble in a hydrocarbon, as well as those which form homogeneous colloidal dispersions in a solvent. A large number of such homogeneous catalyst systems are known. These generally contain a compound of a metal of Group VIII in admixture with compounds of other metallic or non-metallic elements. For example, a suitable catalyst can be made by combining a hydrocarbon-soluble compound of a Group VIII metal with a trihydrocarbylaluminum compound.

One preferred homogeneous hydrogenation catalyst system employs two components, one being a reducing metal compound which can be represented by the formula $MR_y$, wherein M represents a metal of Groups I-A, II-A, or III-A of the periodic System as shown on page B-2 of the "Handbook of Chemistry and Physics", 45th edition, published by the Chemical Rubber Company in 1964, $y$ is the valence of the metal M, and each R is hydrogen or a hydrocarbyl radical having 1-20 carbon atoms such as alkyl, cycloalkyl, aryl, or combinations thereof. Typical compounds representative of this component for the catalyst system include triisobutylaluminum, triethylaluminum, trieicosylaluminum, dicyclohexyl(phenyl)aluminum, 1-anthracenylpotassium, di-3-phenanthrylberyllium, n-butyllithium, dimethylmagnesium, di-n-propylbarium, tri-n-pentylgallium, diisobutylaluminum hydride, sodium hydride, aluminum hydride, and the like. Trialkylaluminum compounds are preferred.

The second component of the preferred homogeneous catalyst system is a metal salt having the formula

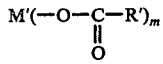

in which M' is a Group VIII metal; R' has the same meaning as R in the formula for the first catalyst component; and m is the valence of M'. The second component is preferably a nickel salt. Typical compounds are nickel stearate, nickel acetate, nickel propionate, nickel formate, nickel octoate, nickel salicylate, nickel benzoate, nickel naphthenate, and the corresponding iron, cobalt, palladium, platinum, ruthenium, rhodium, iridium, and osmium esters such as ferric stearate, cobalt naphthenate, cobalt octoate, ruthenium acetate, rhodium naphthenate, iridium propionate, osmium formate and the like. Of this group, nickel stearate, nickel octoate, and nickel naphthenate are the presently preferred compounds.

It is preferred to use the nickel salts of organic acids having 5-20 carbon atoms, preferably branched, because they are more readily soluble in the treating mixture. Lower molecular weight acid salts, however, such as nickel acetate can be used, and one method of improving the physical form of such materials for use in the process is to grind the nickel acetate with mineral oil to form a very fine slurry prior to combining it with the reducing metal compound.

The catalysts are prepared by mixing the components in a solvent, for example, the hydrocarbon solvent to be used for the treating medium. Catalyst poisons such as oxygen, water, or the like should be avoided. The ratio of the reducing metal component to the Group VIII metal compound on a molar basis is generally in the range of 0.1 to 10, and preferably in the range of 0.5 to 5, moles per mole. The concentration of the catalysts in the reaction mixture is generally in the range of 0.001 to 10 weight percent based on the polymer and preferably in the range of 0.002 to 5 weight percent. Greater or lesser amounts of catalyst can, however, be used.

As known in the art, to hydrogenate at least a portion of the olefinic unsaturation, the polymer, generally in solution, is contacted with the hydrogenation catalyst under conditions which include temperatures in the range of about 10° C to about 250° C and pressures in the range of about atmospheric up to about 1,000 psig (6900 kPa). The reaction time can vary from one minute to 25 hours or more. Preferably in this invention the temperatures employed are in the range of about 75° C to about 200° C, pressures are in the range of about 10 to about 500 psig (69 to 3450 kPa, and reaction times are in the range of about 10 minutes to about 10 hours. When treating the polymer in solution the pressure is usually that sufficient to maintain the reaction mixture substantially in the liquid phase.

In accordance with this invention, any hydrogenation conditions are sufficient which increase the green tensile strength of the copolymer. The extent of hydrogenation is determined by the increase desired in green tensile strength. Generally the hydrogenation involves saturating a substantial amount of the unsaturation of the parent copolymer, i.e. at least about 25 percent. Preferably, only about 2 to about 0.5 percent of the original unsaturation remains after the hydrogenation.

Upon the effective completion of the hydrogenation reaction, the hydrogenated polymer can be isolated by simple, well-known techniques. For example, the catalyst components can be converted to water-soluble salts and washed from the polymer solution. The polymer solution can then be dried, and an antioxidant added if desired, and the polymer isolated by evaporation of the solvent.

The hydrogenated polymers of this invention can be employed in the fabrication of hoses, belts, shoe soles, and miscellaneous molded articles. The hydrogenated polymers of this invention can be compounded with plasticizers, stabilizers, antioxidants, fillers, pigments, and other such additives known to those skilled in the art of rubber compounding.

A better understanding of the invention will be provided by the following illustrative examples.

EXAMPLE I

A polymerization was made in accordance with the following recipe. The recipe components are listed in the order charged. The polymerization was carried out under nitrogen in a capped beverage bottle employing anhydrous reactants and conditions. The bottle was tumbled in a constant temperature bath for the stipulated polymerization time and at the stipulated temperature.

| Recipe | | |
|---|---|---|
| | phm[a] | mhm[b] |
| Toluene (PhMe) | 220 | |
| Butadiene (Bd) | 40 | |
| Cyclohexadiene (CH) | 60 | |
| Bis(1,5-cyclooctadiene)-nickel [(COD)$_2$Ni] | | 4.5 |
| TiCl$_4$ | | 7.5 |
| Polymerization temperature, ° C | 30 | |
| Polymerization time, hours | 24 | |

[a]Parts by weight per hundred parts of monomer.
[b]Gram millimoles per hundred grams of monomer.

Following polymerization, the soluble nickel catalyst was removed by tumbling the product mixture in the presence of air until a black-to-amber color change was noted, an aqueous mixture of phosphoric acid and ammonium phosphate was added, the aqueous solution containing the metal ions was withdrawn, the polymer was coagulated by addition of isopropyl alcohol, and, after two solubilize-the-polymer-in-toluene/coagulate-the-polymer-in-isopropyl-alcohol cycles, volatiles were stripped under reduced pressure at 50°–60° C. The weight percentage conversion was 69 percent.

A portion of the above synthesized polymer was dissolved in toluene and hydrogenated at 70° C and approximately 50 psig for five hours employing a preformed catalyst derived from the reduction of 5 mhm of nickel octoate by 10 mhm triethylaluminum. After hydrogenation, the polymer solution was mixed with water to destroy the triethylaluminum and aerated to oxidize the nickel. It was then treated with a mixture of aqueous phosphoric acid and ammonium phosphate to form the respective metal phosphates which were then discarded with the aqueous phase. Then for each 100 parts by weight of polymer one part by weight of 2,6-di-t-butyl-4-methylphenol in toluene-isopropyl alcohol solution was added, and, in each case, the organic phase was then mixed with isopropyl alcohol to coagulate the polymer. The polymer was separated by filltration, and solvent traces were removed under reduced pressure.

The properties determined for the hydrogenated polymer are shown below in Table I with those of the parent or unhydrogenated polymer.

Table I

| Polymer | Parent (Unhydrogenated) | Hydrogenated |
|---|---|---|
| I.V.[a] | 0.57 | 0.85 |
| Gel, Wt. Percent[b] | 0 | 0 |
| $M_w \times 10^{-3}$[c] | 131 | —[g] |
| $M_n \times 10^{-3}$[c] | 40 | —[g] |
| H.I.[d] | 3.3 | —[g] |
| Trans. Wt. Percent[e] | 1.3 | 1.1 |
| Vinyl Wt. Percent[e] | 0.5 | 0.3 |
| Laboratory Tensile 25° C. psig[f] | 45 | 3000 |
| Laboratory Elongation 25° C, %[f] | 2000 | 400 |

[a]Inherent viscosity determined in accordance with U.S. 3,278,508, column 20, note (a), with the modification that tetrahydrofuran was used in place of toluene for the parent polymer although toluene was used with the hydrogenated polymer. Additionally, the determination involved the further modification that the test solution was not filtered through a sulfur absorption tube, but rather a sample of the solution was filtered through a fritted glass filter stick of grade C porosity and pressured directly into the viscosimeter.
[b]U.S. 3,278,508, column 20, note (b), employing tetrahydrofuran in place of toluene for the parent polymer but employing toluene for the hydrogenated polymer.
[c]Weight average molecular weight $M_w$ and number average molecular weight $M_n$ determined by gel permeation chromatography in accordance with G. Kraus and C. J. Stacy, J. Poly. Sci. A-2 10, 657 (1972).
[d]Heterogeneity index is the quotient obtained by dividing the weight average molecular weight by the number average molecular weight.
[e]Polymer microstructure was determined by infrared absorption spectroscopy.
[f]Laboratory tensile and elongation values were determined by an Instron Model TM, Instron Engineering Corp., Quincy, Mass., employing samples of dimensions length, 1 in.; width, 0.125 in.; thickness, 0.020 to 0.035 in. with a draw rate of 10 in./min. at 25° C.
[g]A dash indicates no determination was made. Data are lacking on the hydrogenated polymer since it was essentially insoluble in tetrahydrofuran - the solvent employed for those determinations.

In considering the data in Table I, the dramatic jump in tensile strength upon hydrogenation was decidedly unexpected. Additionally, the tensile for the hydrogenated polymer is remarkably high in view of its molecular weight (reflected through molecular weight values for the parent, unhydrogenated polymer).

EXAMPLE II

Two 1,3-cyclohexadiene-butadiene copolymers were prepared having different monomer ratios. The resulting polymers were then hydrogenated and evaluated. The polymers were prepared employing the procedures set forth in Example I. As in Example I, 220 phm of toluene diluent, 4.5 mhm bis(1,5-cyclooctadiene)nickel, and 7.5 mhm TiCl$_4$ were employed. The ratio of parts by weight of butadiene to cyclohexadiene was 40/60 for polymer 1 (P1) and 60/40 for polymer 2 (P2). The physical characteristics of polymers 1 and 2 and their hydrogenated derivatives is shown in Table II.

Table II

| Polymer | P1 | 1-H[a] | P2 | 2-H[b] |
|---|---|---|---|---|
| Conversion, Wt. % | 58 | —[c] | 69 | — |
| I.V. | 0.45 | 0.28 | 0.78 | 0.65 |
| Gel, Wt. % | 0 | 0 | 0 | 35[d] |
| $M_w \times 10^{-3}$ | 386 | — | 270 | — |
| $M_n \times 10^{-3}$ | 76 | — | 36 | — |
| H.I. | 5.1 | — | 7.6 | — |
| Melt Flow[e]: | | | | |
| 180° C/5kg | — | 0 | — | 0 |
| 200° C/21.6kg | — | 0.1 | — | 0.3 |
| 200% Modulus at 26° C, psi[f] | — | 2250 | — | 410 |
| Tensile[f]: | | | | |
| at 26° C, psi | — | 2460 | — | 610 |
| at 50° C, psi | — | 710 | — | 140 |
| at 70° C, psi | — | 250 | — | 50 |
| Elongation[f]: | | | | |
| at 26° C, % | — | 210 | — | 470 |
| at 50° C, % | — | 280 | — | 180 |
| at 70° C, % | — | 260 | — | 100 |
| Shore A Hardness[g] | — | 77 | — | 71 |
| Percent Set at Break[f] | — | 2 | — | 220 |
| Ozone Resistance[h] | — | Good | — | Good |
| Laboratory Tensile, | | | | |

Table II-continued

| Polymer | P1 | 1-H[a] | P2 | 2-H[b] |
|---|---|---|---|---|
| at 25° C, psi | <100 | 3500 | Viscous Liquid | 660 |
| Laboratory Elongation at 25° C, % | — | 250 | — | 400 |

[a]The hydrogenated derivative of (parent or unhydrogenated) polymer from Polymer 1.
[b]The hydrogenated derivative of (parent or unhydrogenated) polymer from Polymer 2.L6 [c]A dash indicates no determination was made.
[d]Insoluble polymer.
[e]ASTM D 1238.
[f]ASTM D 412-66.
[g]ASTM D 2240-68.
[h]No cracks appeared in a specimen 5 in. by 0.5 in. by 0.08 in. clamped in bent loop shape such that specimen ends were face-to-face while exposed to 50 parts ozone per hundred million air at 40° C for three days.

Considering the parent or unhydrogenated polymer, polymer 1 (Bd/Ch, 40/60), a tough, rubbery polymer, upon hydrogenation yielded a derivative polymer possessing desirably low set and significant tensile strength. Polymer 2 (Bd/CH, 60/40) was a viscous liquid which, upon hydrogenation, yielded an improved derivative polymer, possessing good tensile and toughness. Furthermore, of the two hydrogenated runs, the polymer containing the lower Bd/CH (40/60) ratio possessed a lower set at break and higher tensile strength. Hydrogenation resulted in good ozone resistance for both polymers.

It is to be understood that the foregoing examples have been provided merely to enable those skilled in the art to better understand and practice the invention. The illustrative details disclosed in this application are not to be construed as limitations on the invention. Obvious modifications and variations will be within the scope of the following claims.

What is claimed is:

1. A hydrogenated copolymer of 1,3-cyclohexadiene having unusually high green tensile strength formed by (1) copolymerizing 1,3-cyclohexadiene and 1,3-butadiene in a weight ratio in the range of about 40/60 to about 60/40 under copolymerizing conditions in the presence of a catalyst mixture consisting of catalytic amounts of titanium tetrachloride and at least one cyclopolyolefin nickel complex of the formula $$Ni(L)_n$$

wherein $n$ is an integer of 1 to 4 and each ligand L is individually selected from the group consisting of cyclopolyolefin having 5 to 18 carbon atoms, 5 to 14 of which make up a cyclic ring containing at least two ethylenic groups and (2) hydrogenating at least about 98 percent of the unsaturation of the resulting copolymer under conditions sufficient to increase the green tensile strength of said copolymer.

2. A hydrogenated copolymer of claim 1 wherein the hydrogenation is effected by contacting the unsaturated copolymer with a homogeneous hydrogenation catalyst in an inert diluent.

3. A hydrogenated copolymer of claim 2 wherein the homogeneous hydrogenation catalyst comprises (1) a reducing metal compound of the general formula $MR_y$ wherein M represents a metal of the Groups I-A, II-A, or III-A, and $y$ is equal to the valence of the metal M, and each R is hydrogen or a hydrocarbyl radical having 1 to 20 carbon atoms, and (2) a metal salt having the general formula $$M'(-O-C-R')_m$$
$$\parallel$$
$$O$$

wherein M' is a Group VIII metal, R' is hydrogen or a hydrocarbyl radical having 1 to 20 carbon atoms, and $m$ is the valence of the metal M'.

4. A hydrogenated copolymer of claim 3 wherein the metal ester component of the hydrogenation catalyst is a nickel salt of a carboxylic acid having 5 to 20 carbon atoms and the reducing metal compound is a trialkylaluminum compound.

5. A hydrogenated copolymer of claim 4 wherein the hydrogenation is conducted at a temperature of from about 10° C to about 250° C and a pressure from about atmospheric to about 1,000 psig (6900 kPa).

6. A hydrogenated copolymer of claim 4 wherein the hydrogenation is conducted at a temperature of about 75° C to about 200° C and a pressure of about 10 to about 500 psig (69 to 3450 kPa).

7. A hydrogenated copolymer of claim 6 wherein the cyclopolyolefin nickel complex polymerization cocatalyst consists of at least one nickel complex in which each ligand L is selected from the nonconjugated cyclopolyolefin ligands having 8 to 12 carbon atoms in the cyclic ring.

8. A hydrogenated copolymer of claim 7 wherein the copolymerization catalyst comprises titanium tetrachloride and bis(1,5-cyclooctadiene)nickel.

9. A hydrogenated copolymer of claim 8 wherein the mole ratio of titanium tetrachloride to bis(1,5-cyclooctadiene)nickel in the catalyst mixture is in the range of about 30:1 to about 1:30.

10. A hydrogenated copolymer of claim 9 wherein about 0.5 to about 50 millimoles of bis(1,5-cyclooctadiene)nickel are employed per hundred grams of total monomer in the copolymerization and from about 0.5 to about 30 moles of titanium tetrachloride are employed for each mole of bis(1,5-cyclooctadiene)nickel.

11. A hydrogenated copolymer of claim 10 wherein the copolymerization is conducted at a temperature in the range of about 0° to about 100° C. and at a pressure sufficient to maintain the reaction mixture substantially in the liquid phase.

12. A hydrogenated copolymer of claim 11 wherein the hydrogenation catalyst comprises nickel octoate and triethylaluminum.

13. A method for producing hydrogenated 1,3-cyclohexadiene/1,3-butadiene copolymers having unexpectedly high green tensile strength comprising (1) copolymerizing 1,3-cyclohexadiene and 1,3-butadiene in a weight ratio in the range of about 40/60 to about 60/40 under copolymerizing conditions in the presence of a catalyst mixture consisting of catalytic amounts of titanium tetrachloride and at least one cyclopolyolefin nickel complex of the formula Ni(L)$_n$ wherein $n$ is an integer of 1 to 4 and each ligand L is individually selected from the group consisting of cyclopolyolefins having 5 to 18 carbon atoms, 5 to 14 of which make up a cyclic ring containing at least two ethylenic groups and (2) hydrogenating at least about 98 percent of the unsaturation of the resulting copolymer under conditions sufficient to increase the green tensile strength of said copolymer.

* * * * *